United States Patent [19]
Murdock et al.

[11] 3,907,817
[45] Sept. 23, 1975

[54] PYRIDINE DERIVATIVES OF (1-(3-PHENANTHRYL)ETHYLIDENE)HYDRAZINE

[75] Inventors: Keith Chadwick Murdock, Pearl River; Robert Alton Herndon, Tomkins Cove, both of N.Y.

[73] Assignee: American Cyanamid Company, Stamford, Conn.

[22] Filed: Jan. 29, 1974

[21] Appl. No.: 437,550

[52] U.S. Cl. ...... 260/295 H; 260/295.5 H; 424/266
[51] Int. Cl.² ........................................ C07D 213/77

[58] Field of Search .................. 260/295.5 H, 295 H

[56] References Cited
UNITED STATES PATENTS
3,503,987   3/1970   Kawai et al. ..................... 260/295 H

*Primary Examiner*—Alan L. Rotman
*Attorney, Agent, or Firm*—Ernest Y. Miller

[57] ABSTRACT

Preparation and use of pyridylcarbonyl derivatives of [1-(3-phenanthryl)alkylidene]hydrazine are described. These compounds have antirhinoviral activity.

4 Claims, No Drawings

PYRIDINE DERIVATIVES OF (1-(3-PHENANTHRYL)ETHYLIDENE)HYDRAZINE

DESCRIPTION OF THE INVENTION

This invention relates to compounds of the formula:

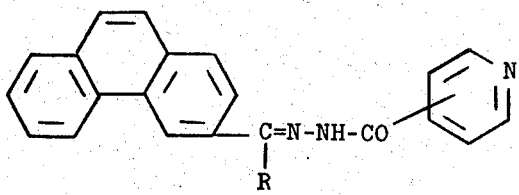

wherein R is loweralkyl of $C_1$ to $C_4$ and where the pyridyl substituent may be in the 2, 3 or 4-position of the pyridine ring.

The present invention also includes the pharmaceutically acceptable acid addition salts of the compounds of the above formula. Among these salts are the hydrochloride, hydrobromide, sulfate, maleate and citrate, all of which are prepared by methods well known to those skilled in the art.

The compounds of the present invention may be prepared as follows:

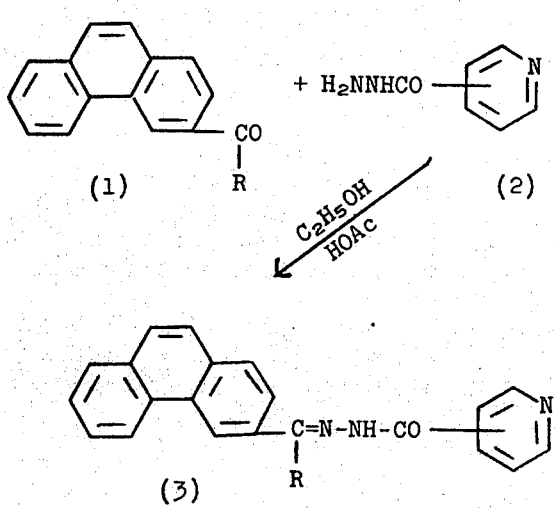

where R is as defined above.

A solution of a 3-alkanoylphenanthrene (1) and the selected pyridinecarboxylic acid hydrazide (2) in ethanol containing a small amount of an acid such as acetic acid is heated under reflux for several hours and cooled to give the product (3).

Amoung the compounds which may be prepared by the above procedure are the following:

Isonicotinoyl [1-(3-Phenanthryl)ethylidene]hydrazide
Nicotinoyl [1-(3-Phenanthryl)ethylidene]hydrazide
2-Pyridylcarbonyl [1-(3-phenanthryl)ethylidene]-hydrazide The compounds of the present invention exhibit antiviral activity in vitro against a variety of rhinoviruses. They are useful in treating warm-blooded animals in the form of a topical preparation such as a nasal spray.

The active components of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, or similar materials on non-toxic pharmaceutically acceptable diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described. They may be administered in dosage units containing from about 10 mg. to 1000 mg., in association with a pharmaceutical carrier two to four times a day.

Compounds of the present invention are tested in the following manner. Confluent monolayers of a continuous cell-line such as HeLa, HEp-2, KB or L-132 grown in plastic tissue culture dishes were infected with one of the viruses causing respiratory illness such as the "common cold." These viruses include members of the picornavirus group including the rhinoviruses, for example, types 1B, 2, 5, or 23 and including the enteroviruses, for example, coxsackie A-21. Protection of the tissues to the cytopathic effects of the viruses was ascertained by means of a plaque inhibition test in which the test compound was adsorbed onto a filter paper disc and placed on the agar used to overlay the infected cell monolayers, or by incorporation into the said agar overlay. The agar overlay medium used for this purpose has the following formulation: Minimum Essential Medium (Eagles) containing Earle's salts (Grand Island Biological Company, Grand Island, New York) and to which has been added

| | |
|---|---|
| Ionagar No. 2 | 0.4% |
| Diethylaminoethyl dextran | 0.01% |
| Magnesium chloride | 0.06% |
| Fetal calf serum | 2% v/v |

The virus-infected cell monolayers plus test compound were incubated for 3 to 5 days in a humidified atmosphere of 5% carbon dioxide at either 33°C. or 37°C., depending on the virus. The ability of these compounds to protect tissues from destruction by the viruses was then evident after staining the residual, uninfected cells with 0.5% crystal violet in 20% ethanol. The results with representative compounds is summarized in the following Table.

TABLE

| Compound | Rhinovirus | | | |
|---|---|---|---|---|
| | 1B | 2 | 5 | 23 |
| Isonicotinoyl [1-(3-Phenylanthryl)ethylidene]-hydrazide | + | + | + | + |
| Nicotinoyl [1-(3-Phenanthryl)ethylidene]hydrazide | + | + | | + |

In addition, nicotinoyl [1-(3-phenanthryl)ethylidene]-hydrazide is also active in providing protection against coxsackie A-21 virus.

SPECIFIC DISCLOSURE

The following examples will serve to further illustrate the invention.

EXAMPLE 1

Preparation of Isonicotinoyl [1-(3-phenanthryl)ethylidene]hydrazide

A solution of 11.01 gm. (0.05 mole) of 3-acetylphenanthrene, 6.85 gm. (0.05 mole) of isonicotinic acid hydrazide and 0.1 ml. of acetic acid in 100 ml. of anhydrous ethanol is heated under reflux for 3 hours. The mixture is cooled and the 14.2 gm. of solid which forms is collected. This solid is recrystallized from dimethylformamide and washed with acetone yielding 11.60 gm. of a white solid, melting point 256°–258°C.

Analysis calculated for $C_{22}H_{17}N_3O$: C, 77.8; H, 5.1; N, 12.4. Found: C, 77.7; H, 5.2; N, 12.2.

EXAMPLE 2

Preparation of Nicotinoyl [1-(3-phenanthryl)ethylidene]hydrazide

A solution of 11.01 gm. (0.05 mole) of 3-acetylphenanthrene, 6.85 gm. (0.05 mole) of nicotinic acid hydrazide and 0.1 ml. of acetic acid in 100 ml. of anhydrous ethanol is heated under reflux for 3 hours. The mixture is cooled and the solid which forms is collected. This solid is recrystallized from dimethylformamide and washed with acetone, yielding 9.0 gm. of white crystals, melting point 210°–212°C.

Analysis calculated for $C_{22}H_{17}N_3O$: C, 77.8; H, 5.0; N, 12.4. Found: C, 77.6; H, 5.1; N, 12.4.

EXAMPLE 3

Preparation of 2-Pyridylcarbonyl [1-(3-phenanthryl)ethylidene]hydrazide

The above compound is prepared by the method of Example 2 except that nicotinic acid hydrazide is replaced with 2-pyridinecarboxylic acid hydrazide.

We claim:
1. A compound of the formula:

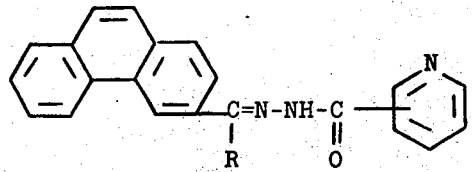

wherein R is loweralkyl $C_1$–$C_4$, or a pharmaceutically acceptable acid addition salt thereof.

2. The compound isonicotinoyl [1(3-phenanthryl)-ethylidene]hydrazide.

3. The compound nicotinoyl [1-(3-phenanthryl)ethylidene]hydrazide.

4. The compound 2-pyridylcarbonyl [1-(3-phenanthryl)-ethylidene]hydrazide.

* * * * *